(12) United States Patent
Hung et al.

(10) Patent No.: US 6,535,653 B1
(45) Date of Patent: Mar. 18, 2003

(54) VARIABLE CHIRP OPTICAL MODULATOR

(75) Inventors: Henry Hung, Paradise Valley, AZ (US); Clarence Laskoskie, Scottsdale, AZ (US)

(73) Assignee: Donald J. Lenkszus, Scottsdale, AZ (US)

( * ) Notice: Subject to any disclaimer, the term of this patent is extended or adjusted under 35 U.S.C. 154(b) by 0 days.

(21) Appl. No.: 09/680,626

(22) Filed: Oct. 6, 2000

(51) Int. Cl.⁷ .............................................. G02F 1/035
(52) U.S. Cl. ................................................ 385/2; 385/40
(58) Field of Search ............................. 385/1, 2, 3, 14, 385/39, 40, 140, 131

(56) References Cited

U.S. PATENT DOCUMENTS 5,835,212 A * 11/1998 Kissa et al. ................. 356/477
6,192,167 B1 * 2/2001 Kissa et al. ................... 385/14

* cited by examiner

*Primary Examiner*—Hung N. Ngo
(74) *Attorney, Agent, or Firm*—Donald J. Lenkszus (57) ABSTRACT

A variable chirp optical modulator is provided in which an optical waveguide is split for part of its length into first and second waveguide arms. Electrode pairs are utilized to provide modulating electric fields in a portion of the first and second waveguide arms. The optical lengths of the portions of the first and second waveguide arms that are subject to the modulating electric fields are different and are selected to provide a predetermined level of chirp. By controlling the optical power split from the optical waveguide to the first and second arms, the chirp is varied from the predetermined level.

24 Claims, 4 Drawing Sheets

VARIABLE CHIRP OPTICAL MODULATOR

FIELD OF THE INVENTION

This invention pertains to optical systems, in general, and to optical modulators for use in optical systems in particular.

BACKGROUND OF THE INVENTION

The term "optical system" as used herein refers to any system that utilizes light waves to convey information between one node and one or more other nodes.

Much of the optical communications network in place utilizes optical fibers. One property of optical fibers that is of concern is dispersion. Dispersion in optical fiber occurs as a result of variation in the refractive index of the optical fiber with wavelength. Modulation of an optical signal results in optical harmonics of the modulation frequency about the carrier frequency. When modulated light is passed through a length of optical fiber that exhibits chromatic dispersion, the phase of the light at the distal end of the fiber varies as a function of its frequency thus producing phase modulation. Detection of optical signals causes mixing of the various frequency components, but because the various frequency components have differing phases, the mixing results in the amplitude of the detected signal changing on account of the linewidth of the transmitted signal.

In other words, in a dispersive medium, different wavelengths of light travel at slightly different velocities. This causes optical pulses to broaden in wavelength as they travel down optical fiber links, causing difficulty at a receiver when reconstructing an electrical pulse from a received optical pulse. With the advent of erbium doped fiber amplifiers, longer distances are traversed over optical fiber. The problems caused by dispersion are referred to as "chirping". Chirping becomes increasingly more significant of a problem at higher modulation frequencies such as frequencies at 10 GHz and above. One limiting factor on the length of links in long haul transmission of optical signals is chromatic dispersion that occurs because a transmitter has a real optical linewidth and the refractive index of optical fiber varies, dependent upon the wavelength of the optical signals. Optical linewidth of a transmitter is determined by two factors. The factors are the inherent linewidth at DC and the broadening of the linewidth introduced by modulation. Broadening of the linewidth introduced by modulation is referred to as "static" chirp. Other optical components may introduce a shift to the center frequency of the optical linewidth; this is referred to as dynamic chirp.

Static and dynamic chirp introduce a pulse width change or phase modulation and an amplitude shift or intensity modulation in the optical signal. The intensity modulation changes are such that there may be a combination of link length, dispersion and frequency that completely nulls out the signal to be detected. In the case of pulse width changes, positive dynamic chirp will broaden the width of a pulse propagating down a fiber and negative dynamic chirp will narrow the pulse. Either of the two effects can render a modulated signal undetectable.

The chirp effects can be compensated for by deliberate introduction of an offsetting chirp in modulated signals. Various modulators providing controlled chirp have been described in the prior art. Typically such modulators are based upon designs that form the modulator on a substrate. The substrate material is frequently lithium niobate (LiNbO$_3$) although other electro-optic materials may be used.

The electro-optic effect in LiNbO$_3$ depends on the direction of the electric field relative to the orientation of the crystalline structure of the substrate along which the optical wave propagates. In an orientation referred to as an "X-cut" the optic axis is parallel to the plane of the substrate and at right angles to the direction of propagation of the optical wave. In an orientation referred to as "Z-cut" the optic axis is normal to the plane of the substrate.

SUMMARY OF THE INVENTION

In accordance with the principles of the invention, an optical modulator comprises an optical waveguide split for part of its length into first and second waveguide arms that are recombined into an output waveguide portion. A first electrode pair is positioned proximate the first waveguide arm to subject a first portion of the first waveguide arm to a first modulating electric field. A second electrode pair is positioned proximate the second waveguide arm to subject a first portion of the second waveguide arm to a second modulating electric field. In accordance with the invention, the second waveguide first portion is selected to be shorter than the first waveguide first portion to provide a predetermined amount of chirp.

In accordance with one aspect of the invention, adjusting the optical power split from the optical waveguide to the first and second waveguide arms varies the chirp. The power split in one embodiment of the invention is controlled by means to a tunable attenuator provided in one of the first or second waveguide arms.

In another embodiment of the invention, the power split between the first an second waveguide arms is controlled by a tunable "y" coupling the optical waveguide to the first and second waveguide arms.

In another embodiment of the invention, providing quadrature biasing to the first and second waveguide arms using bias electrodes varies the chirp.

In one embodiment of the invention, the first and second electrode pairs share a common electrode.

BRIEF DESCRIPTION OF THE DRAWING

The invention will be better understood from a reading of the following detailed description in conjunction with drawing, in which like reference designations in the various drawing figures are used to identify like elements, and in which.

DETAILED DESCRIPTION

Figure 1:
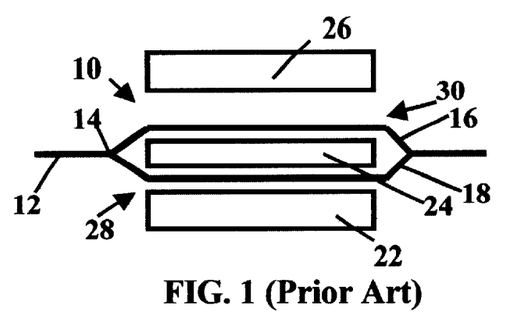
FIG. 1 illustrates a portion of a prior art integrated optic Mach Zehnder Interferometer modulator.

Turning now to FIG. 1, a portion of a prior art integrated optic Mach Zehnder Interferometer modulator 10 is shown. Mach Zehnder Interferometer type modulators are typically utilized in prior modulator designs. A Mach Zehnder Interferometer modulator configuration comprises an optical waveguide splitter coupled to two waveguide arms and a waveguide combiner. Electrodes are associated with each of the two waveguide arms and provide a modulation voltage to one or both electrodes. The modulation voltages change the optical index of the waveguide arms and thereby change the relative phase of the two light beams. A differential phase change may result in both beams combining in phase to give a maximum intensity signal. This is the "on" state. A λ/2 degree phase shift difference results in beam extinction or an "off" state. Chirp can be created by uneven modulation between the two waveguide arms of the Mach Zehnder Interferometer modulator.

The Intensity Modulation effect Vpi is the voltage differential between the Mach Zehnder Interferometer modulator electrodes. A trade off between the intensity modulation effect and the amount of chirp is required. That is, larger chirp requires a higher Vpi.

Figure 2:
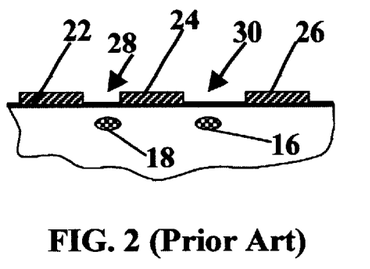
FIG. 2 is a partial cross-section of the prior art device of FIG. 1.

Modulator 10 includes an optical waveguide 12 that is split by an optical splitter 14 into two waveguide arms 16, 18. Optical waveguide arms 16, 18 are rejoined with an optical coupler 20. FIG. 2 shows modulator 10 in cross section. The modulator is formed on a substrate 1 that is typically lithium niobate. Optical waveguide arms 16, 18 are formed in substrate 1. Electrodes 22, 24, 26 are formed on substrate 1 proximate optical waveguide arms 16, 18. The distance between electrode 22 and electrode 24 is different from the distance between electrode 24 and electrode 26, providing uneven gaps 28, 30 between electrode pairs. This approach is utilized in the integrated optical modulator of U.S. Pat. No. 6,052,496.

Figure 3:
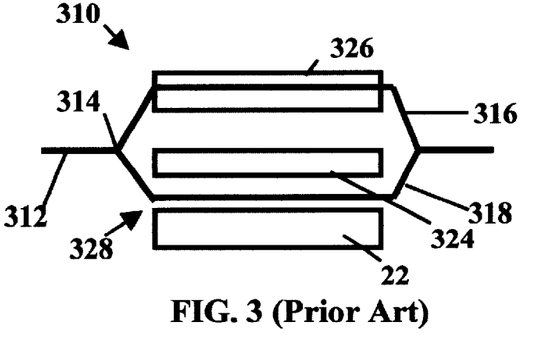
FIG. 3 illustrates a second prior art integrated optic modulator.
Figure 4:
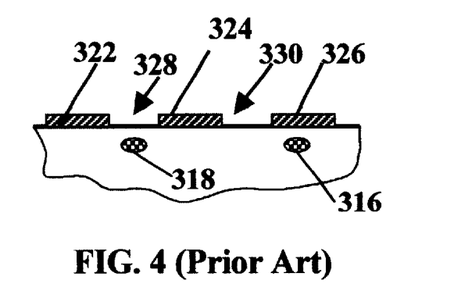
FIG. 4 is a partial cross-section of the prior art device of FIG. 3.

A second prior art integrated optic Mach Zehnder Interferometer modulator 210 is shown in FIGS. 3 and 4. Modulator 310 includes an optical waveguide 312 that is split by an optical splitter 314 into two waveguide arms 316, 318. Optical waveguide arms 316, 318 are rejoined with an optical coupler 320. FIG. 4 shows modulator 310 in cross section. The modulator is formed on a substrate 301 that is typically lithium niobate. Optical waveguide arms 316, 318 are formed in substrate 301. Electrodes 322, 324, 326 are formed on substrate 301 proximate optical waveguide arms 316, 318. One waveguide arm 318 is disposed such that the adjacent electrodes 322, 324 are located on either side of waveguide arm 318. Electrode 326 is disposed above optical waveguide arm 318. The distance between the electrode pair comprising electrode 322 and electrode 324 is the same as the distance between the electrode pair comprising electrode 324 and electrode 326, providing even gaps 328, 330 between electrode pairs.

Figure 5:
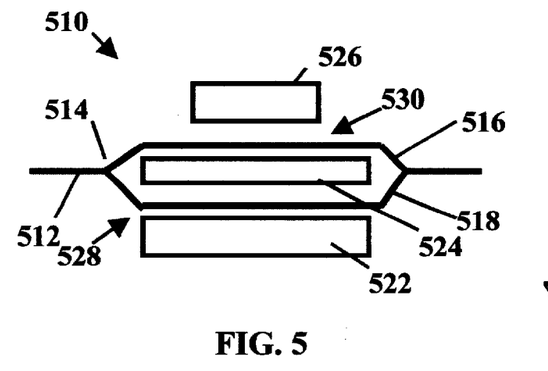
FIG. 5 depicts an integrated optic modulator in accordance with the principles of the invention.
Figure 6:
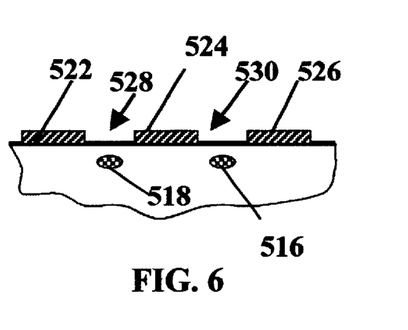
FIG. 6 is a partial cross-section of the modulator of FIG. 5.

Turning now to FIGS. 5 and 6, the approach in accordance with the present invention is illustrated. In accordance with the invention, an integrated optic modulator 510 includes an optical waveguide 512 that is split by an optical splitter 514 into two waveguide arms 516, 518. Optical waveguide arms 516, 518 are rejoined with an optical coupler 520. FIG. 6 shows modulator 510 in cross section. The modulator 510 is formed on a substrate 501 that is lithium niobate. As will be appreciated by those skilled in the art, substrate 501 may be of other material including, but not limited to LiTaO$_3$. Optical waveguide arms 516, 518 are formed in substrate 501. Electrodes 522, 524, 526 are formed on substrate 501 proximate optical waveguide arms 516, 518. The electrodes 522, 524, 526 are arranged to form two electrode pairs with electrode 524 being a common electrode in the two electrode pairs. That is, electrodes 222, 224 form one electrode pair and electrodes 224, 226 form another electrode pair. The distance between electrode 522 and electrode 524 is the same as the distance between electrode 524 and electrode 526, providing even gaps 528, 530 between electrode pairs. However, in contrast to the prior art approach of the device of FIGS. 1 and 2, electrode 526 is a different length than electrode 522.

LiNbO$_3$ substrate modulators used to perform intensity modulation can in general also impress a phase modulation on an optical signal. The degree of phase modulation is expressed as the chirp parameter $$\alpha \equiv \frac{\frac{d\phi}{dt}}{\frac{1}{2}\frac{dI}{dt}} \quad (1)$$

where φ is the phase shift imparted to the output signal and I is the intensity of the light output.

Figure 7:
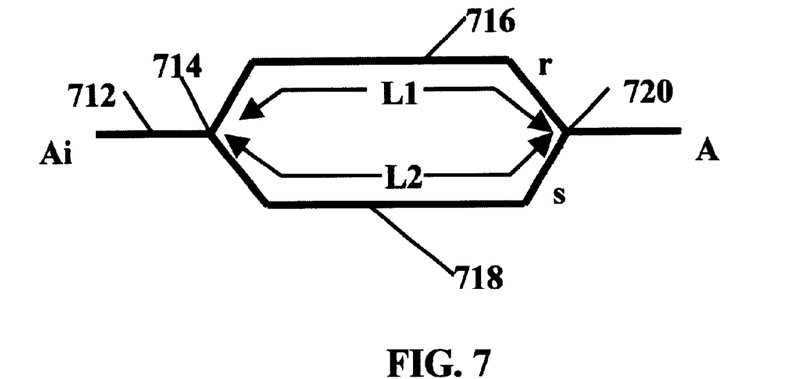
FIG. 7 illustrates the optical waveguide paths of a Mach Zehnder Interferometer modulator in accordance with the invention.

The most common intensity modulator using lithium niobate is the Mach Zehnder Interferometer modulator. Turning now to FIG. 7, only the optical path or a Mach Zehnder Interferometer is shown. The optical waveguide 712 is split by splitter or "y" 714 into two waveguide arms 716, 718 that rejoin at coupler 720. The input signal at an amplitude A$_i$ is split into two signals of respective amplitudes ρA$_i$ and σA$_i$ which propagate along the lengths L$_1$ and L$_2$ of waveguide arms 716, 718 before being recombined. The lengths L$_1$, L$_2$ are the optical path lengths due to intrinsic characteristics of the waveguide arms and any applied electrode voltages. Coupler 720 combines the signals on the two waveguide arms 716, 718. The intensity of the light in each arm is equal. The combined output amplitude, A, is the output amplitude of the optical signals in each waveguide arm 716, 718. The output amplitudes for signals on the two waveguide arms 716, 718 are "r" and "s", respectively, with $$r = \frac{\sqrt{2}}{2} A_i \rho e^{i(\omega t - kL_1)}, \text{ and} \quad (2)$$

$$s = \frac{\sqrt{2}}{2} A_i \sigma e^{i(\omega t - kL_2)}. \quad (3)$$

The resultant output is $$A = r + s = \frac{\sqrt{2}}{2} A_i \{\rho e^{-ikL_1} + \sigma e^{-ikL_2}\} e^{i\omega t}, \quad (4)$$

which may be rewritten as $$A = \frac{\sqrt{2}}{2} A_i e^{i\omega t} \left[ e^{-ik(L_1+L_2)/2} \right. \tag{5}$$

$$\left. e^{-i\tan^{-1}\left\{\frac{\rho-\sigma}{\rho+\sigma}\tan\frac{k(L_1-L_2)}{2}\right\}} \cdot \sqrt{\rho^2 + \sigma^2 + 2\rho\sigma\cos[k(L_1-L_2)]} \right]$$

Now $$\phi = -\frac{k(L_1-L_2)}{2} - \tan^{-1}\left\{\frac{\rho-\sigma}{\rho+\sigma}\tan\frac{k(L_1-L_2)}{2}\right\}, \text{ and} \tag{6}$$

$$d\phi/dt = -(k/2)\left[\frac{d(L1-L2)}{dt} + \frac{(\rho^2\sigma^2)}{\rho^2+\sigma^2+2\rho\sigma\cos[k(L_1-L_2)]}\right], \tag{7}$$

$$I = \frac{1}{2}I_i(\rho^2+\sigma^2+2\rho\sigma\cos[k(L_1-L_2)]) \tag{8}$$

$$\frac{dI}{dt} = \frac{1}{2}I_i\left(-2\rho\sigma\sin[k(L_1-L_2)] \cdot k\frac{d(L_1-L_2)}{dt}\right). \tag{9}$$

The chirp factor, as noted above, is defined as:

$$\alpha \equiv \frac{\frac{d\phi}{dt}}{\left(\frac{1}{2I}\right)\frac{dI}{dt}}. \tag{10}$$

Recognizing that $\rho^2=1-\sigma^2$, allows the expression for the chirp factor to be rewritten as:

$$\alpha = \frac{1-2\sigma^2}{2\sigma\sqrt{1-\sigma^2}\sin[k(L_1-L_2)]} + \tag{11}$$

$$\frac{1+2\sigma\sqrt{1-\sigma^2}\cos[k(L_1-L_2)]}{2\sigma\sqrt{1-\sigma^2}\sin[k(L_1-L_2)]} \cdot \frac{\frac{d(L_1-L_2)}{dt}}{\frac{d(L_1-L_2)}{dt}}.$$

Alternatively, the chirp factor may be expressed in terms of the power, $P_1, P_2$, in each waveguide arm 716, 718, recognizing that $\rho^2=P_1$, and $\sigma^2=P_2$, with $P_1$ being the power in waveguide arm 716 and $P_2$ being the power in waveguide arm 718, as:

$$\alpha = \frac{\left(1-\frac{P_2}{P_1}\right)}{2\sqrt{\frac{P_2}{P_1}}\sin[k(L_1-L_2)]} + \tag{12}$$

$$\frac{1+\frac{P_2}{P_1}+2\sqrt{\frac{P_2}{P_1}}\cos[k(L_1-L_2)]}{2\sqrt{\frac{P_2}{P_1}}\sin[k(L_1-L_2)]} \cdot \frac{\frac{d(L_1+L_2)}{dt}}{\frac{d(L_1-L_2)}{dt}}.$$

Figure 8:
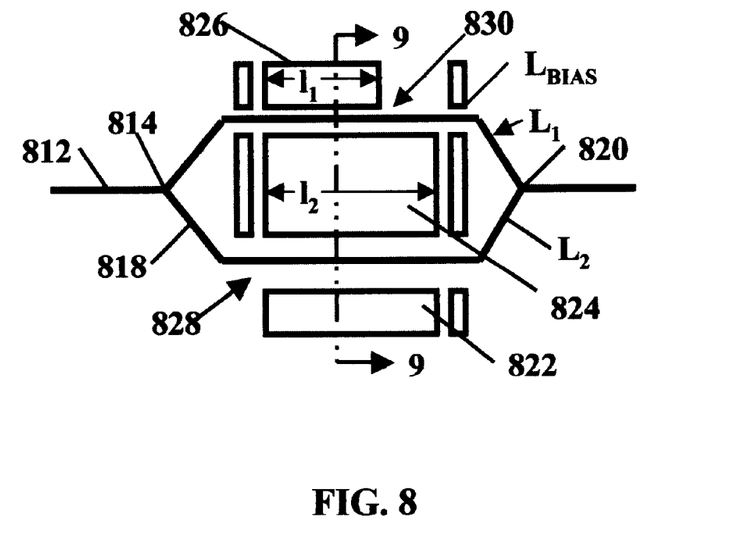
FIG. 8 illustrates a second integrated optic modulator in accordance with the principles of the invention.
Figure 9:
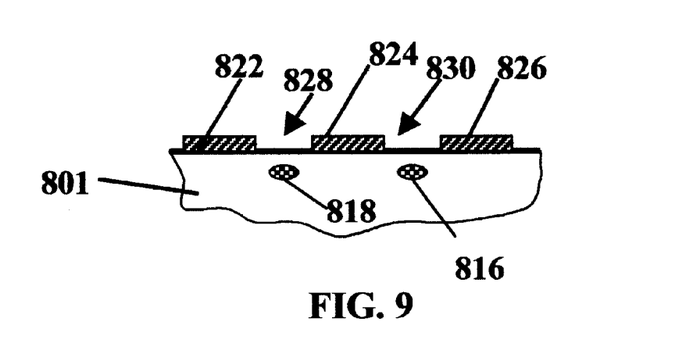
FIG. 9 is a partial cross section of the modulator of FIG. 8 taken along lines 9—9.

Turning now to FIG. 8, a modulator 810 in accordance with the principles of the invention is shown. Integrated optic modulator 810 includes an optical waveguide 812 that is split by an optical splitter 814 into two waveguide arms 816, 818. Optical waveguide arms 816, 818 are rejoined with an optical coupler 820. FIG. 9 shows modulator 810 in cross section taken along lines 9—9. The modulator 810 is formed on a substrate 801 that is lithium niobate. As will be appreciated by those skilled in the art, substrate 801 may be of other material including, but not limited to GaAs. Optical waveguide arms 816, 818 are formed in substrate 801. Electrodes 822, 824, 826 are formed on substrate 801 proximate optical waveguide arms 816, 818. The distance between electrode 822 and electrode 824 is the same as the distance between electrode 824 and electrode 826, providing even gaps 828, 830 between electrode pairs. Electrodes 822 and 824 are of substantially equal effective length, $l_2$, proximate waveguide arm 818. Electrode 826 is configured so as to provide a different effective electrode length, $l_1$, proximate waveguide arm 816. The effective optical path lengths of the waveguide arms 816, 818 are $L_1$ and $L_2$, respectively. The path lengths are affected by the modulation voltage induced path length and a bias induced path length, $L_{bias}$. The optical path lengths of the wave guide arms in the absence of modulation and bias are $L_{10}$ and $L_{20}$. From these identities, $$L_1 = L_{10} + \gamma l_1 V(t) + L_{bias}, \text{ and} \tag{13}$$

$$L_2 = L_{20} - \gamma l_2 V(t) - L_{bias}. \tag{14}$$

From the above, various portions of the other equations may be determined as follows:

$$L_1 + L_2 = L_{10} + L_{20} + \gamma V(t)(l_1 - l_2), \tag{15}$$

$$\frac{d(L_1+L_2)}{dt} = \gamma(l_1 - l_2)\frac{dV}{dt}, \tag{16}$$

$$L_1 - L_2 = L_{10} - L_{20} + \gamma V(t)(l_1 + l_2) + 2L_{bias}, \tag{17}$$

$$\frac{d(L_1-L_2)}{dt} = \gamma(l_1 + l_2)\frac{dV}{dt}, \tag{18}$$

$$k = \frac{2\pi}{\lambda}, \text{ and} \tag{19}$$

$$k(L_1 - L_2) \equiv \phi_{bias} + \frac{\pi}{V_\pi}V(t). \tag{20}$$

For small signals, $\phi_0$ is much smaller than 1. If the power ratio is defined as $X \equiv P_2/P_1$, then the chirp equation becomes:

$$\alpha = \frac{(1-X)}{2\sqrt{X}\sin[\phi_{bias}]} + \frac{(l_1-l_2)}{(l_1+l_2)} \cdot \frac{\left(1+X+2\sqrt{X}\cos\phi_{bias}\right)}{2X\sin[\phi_{bias}]}. \tag{21}$$

To understand the effect of varying the length of the electrodes, the following may be considered. If the electrodes are of equal length $L_0$, the phase shift is $\phi_0 = 2KL_0$, where K contains all the various coefficients in the relevant equations including, but not limited to, the voltage and overlap coefficients. If one electrode is shortened by an amount "z" and the other is lengthened by an amount "w", then $$L_{e1} = L_0 - z = l_1, \tag{22}$$

and $$L_{e2} = L_0 + w = l_2, \tag{23}$$

and $$\phi = K(L_0 - z) + K(L_0 + w) = 2KL_0 + K(w-z). \tag{24}$$

For a 10% increase in voltage (directly changing K) to produce the same phase shift, the equations may be solved to show that $z = 1 + 0.182L_0$, and the modified electrode lengths are $L_{e1}=0.818L_0-w$, and $L_{e2}=L_0+w$. If electrode length alone is used to achieve a chirp parameter of $\alpha=-0.7$, then $$-0.7 = \frac{-(2l+0.182L_0)}{1.818L_0},\qquad(5)$$

yielding $l=0.545L_0$, so that $L_{e1}=0.273L_0$, and $L_{e2}=1.545L_0$.

The use of power adjusting between the two waveguide arms 816, 818 may also be used. Using the above values for $L_{e1}$ and $L_{e2}$ in the chirp parameter equation provides:

$$\alpha = \frac{1-X}{2\sqrt{X}\sin(\phi_b)} - 0.7\frac{(1+x+2\sqrt{X}\cos(\phi_b))}{2\sqrt{X}\sin(\phi_b)}.\qquad(25)$$

If it is desired to adjust the power to achieve ±0.2 chirp, and assuming $$\phi_b = \frac{\pi}{2},$$

the first term in the equation dominates and $$\alpha = \pm 0.2 = \frac{1-X}{2\sqrt{X}}.$$

Solving for X, yields X=1.488, 0.672. With equal power levels in both waveguide arms, i.e., X=1.0 or $P_1=P_2$, a chirp factor of $\alpha=-0.7$ is obtained. With X=1.488, a chirp factor of $\alpha=-0.9$ is obtained. With X=0.672, a chirp factor of $\alpha=-0.5$ is obtained. At either power ratio, an on/off ratio of less than −20 dB is obtained.

From the above analysis, chirp, $\alpha$, and extinction or on-off ratio data has been calculated for different electrode length ratios, $L_{e2}/L_{e1}$, bias deviation from $\pi/2$ and, the power ratio, X, between the waveguide arms. The data is set forth in TABLE 1.

TABLE 1

| electrode length ratio | bias deviation from π/2 | power ratio | chirp | on/off ratio |
|---|---|---|---|---|
| 2.67 | −0.05 π | 1.60 | −0.78569 | −14.2231 |
| 2.67 | −0.05 π | 1.65 | −0.80347 | −14.0227 |
| 2.67 | −0.05 π | 1.70 | −0.82088 | −13.8258 |
| 2.67 | −0.05 π | 1.75 | −0.83794 | −13.6331 |
| 2.67 | −0.05 π | 1.80 | −0.85468 | −13.445 |
| 2.67 | −0.05 π | 1.85 | −0.87111 | −13.2617 |
| 2.67 | −0.05 π | 1.90 | −0.88725 | −13.0834 |
| 2.67 | −0.05 π | 1.95 | −0.9031 | −12.9101 |
| 2.67 | −0.05 π | 2.00 | −0.91869 | −12.7418 |
| 2.67 | −0.025π | 1.60 | −0.74283 | −17.0438 |
| 2.67 | −0.025π | 1.65 | −0.76044 | −16.6611 |
| 2.67 | −0.025π | 1.70 | −0.77769 | −16.2999 |
| 2.67 | −0.025π | 1.75 | −0.79459 | −15.9589 |
| 2.67 | −0.025π | 1.80 | −0.81118 | −15.6366 |
| 2.67 | −0.025π | 1.85 | −0.82746 | −15.3316 |
| 2.67 | −0.025π | 1.90 | −0.84344 | −15.0427 |
| 2.67 | −0.025π | 1.95 | −0.85915 | −14.7687 |
| 2.67 | −0.025π | 2.00 | −0.87459 | −14.5085 |
| 2.67 | 0 | 1.60 | −0.70483 | −18.639 |
| 2.67 | 0 | 1.65 | −0.72239 | −18.0935 |
| 2.67 | 0 | 1.70 | −0.73959 | −175961 |
| 2.67 | 0 | 1.75 | −0.75644 | −17.1398 |
| 2.67 | 0 | 1.80 | −0.77298 | −16.719 |
| 2.67 | 0 | 1.85 | −0.7892 | −16.3292 |
| 2.67 | 0 | 1.90 | −0.80514 | −15.9666 |

TABLE 1-continued

| electrode length ratio | bias deviation from π/2 | power ratio | chirp | on/off ratio |
|---|---|---|---|---|
| 2.67 | 0 | 1.95 | −0.8208 | −15.6281 |
| 2.67 | 0 | 2.00 | −0.8362 | −15.311 |
| 2.67 | 0.025π | 1.60 | −0.6712 | −18.6126 |
| 2.67 | 0.025π | 1.65 | −0.68881 | −18.0671 |
| 2.67 | 0.025π | 1.70 | −0.70606 | −17.5698 |
| 2.67 | 0.025π | 1.75 | −0.72297 | −17.1135 |
| 2.67 | 0.025π | 1.80 | −0.73955 | −16.6928 |
| 2.67 | 0.025π | 1.85 | −0.75583 | −16.303 |
| 2.67 | 0.025π | 1.90 | −0.77182 | −15.9404 |
| 2.67 | 0.025π | 1.95 | −0.78753 | −15.602 |
| 2.67 | 0.025π | 2.00 | −0.80297 | −15.285 |
| 2.67 | 0.05 π | 1.60 | −0.64155 | −18.5329 |
| 2.67 | 0.05 π | 1.65 | −0.65932 | −17.9876 |
| 2.67 | 0.05 π | 1.70 | −0.67674 | −17.4904 |
| 2.67 | 0.05 π | 1.75 | −0.6938 | −17.0343 |
| 2.67 | 0.05 π | 1.80 | −0.71054 | −16.6137 |
| 2.67 | 0.05 π | 1.85 | −0.72697 | −16.2241 |
| 2.67 | 0.05 π | 1.90 | −0.7431 | −15.8617 |
| 2.67 | 0.05 π | 1.95 | −0.75896 | −15.5234 |
| 2.67 | 0.05 π | 2.00 | −0.77455 | −15.2066 |
| 2.67 | 0.075π | 1.60 | −0.61652 | −18.3991 |
| 2.67 | 0.075π | 1.65 | −063367 | −17.8541 |
| 2.67 | 0.075π | 1.70 | −0.65136 | −17.3571 |
| 2.67 | 0.075π | 1.75 | −0.66869 | −16.9013 |
| 2.67 | 0.075π | 1.80 | −0.68569 | −16.481 |
| 2.67 | 0.075π | 1.85 | −0.70238 | −16.0917 |
| 2.67 | 0.075π | 1.90 | −0.71877 | −15.7295 |
| 2.67 | 0.075π | 1.95 | −0.73488 | −15.3915 |
| 2.67 | 0.075π | 2.00 | −0.75071 | −15.075 |
| 2.67 | 0.1 π | 1.60 | −0.59326 | −18.2094 |
| 2.67 | 0.1 π | 1.65 | −0.61172 | −17.6648 |
| 2.67 | 0.1 π | 1.70 | −0.6298 | −17.1682 |
| 2.67 | 0.1 π | 1.75 | −0.64752 | −16.7128 |
| 2.67 | 0.1 π | 1.80 | −0.6649 | −16.2929 |
| 2.67 | 0.1 π | 1.85 | −0.68197 | −15.904 |
| 2.67 | 0.1 π | 1.90 | −0.69872 | −15.423 |
| 2.67 | 0.1 π | 1.95 | −0.71519 | −15.2047 |
| 2.67 | 0.1 π | 2.00 | −0.73138 | −14.8886 |
| 2.67 | 0.125π | 1.60 | −0.57422 | −17.9615 |
| 2.67 | 0.125π | 1.65 | −0.59343 | −17.4174 |
| 2.67 | 0.125π | 1.70 | −0.61204 | −16.9214 |
| 2.67 | 0.125π | 1.75 | −0.63028 | −16.4665 |
| 2.67 | 0.125π | 1.80 | −0.64818 | −16.0471 |
| 2.67 | 0.125π | 1.85 | −0.66574 | −15.6588 |
| 2.67 | 0.125π | 1.90 | −0.68299 | −15.2977 |
| 2.67 | 0.125π | 1.95 | −0.69994 | −14.9607 |
| 2.67 | 0.125π | 2.00 | −0.71661 | −14.6452 |
| 2.5 | −0.05 π | 1.60 | −0.75396 | −14.2231 |
| 2.5 | −0.05 π | 1.65 | −0.77163 | −14.0227 |
| 2.5 | −0.05 π | 1.70 | −0.78894 | −13.8258 |
| 2.5 | −0.05 π | 1.75 | −0.8059 | −13.6331 |
| 2.5 | −0.05 π | 1.80 | −0.82253 | −13.445 |
| 2.5 | −0.05 π | 1.85 | −0.83884 | −13.2617 |
| 2.5 | −0.05 π | 1.90 | −0.85486 | −13.0834 |
| 2.5 | −0.05 π | 1.95 | −0.8706 | −12.9101 |
| 2.5 | −0.05 π | 2.00 | −0.88607 | −12.7418 |
| 2.5 | 0 | 1.60 | −0.66763 | −18.639 |
| 2.5 | 0 | 1.65 | −0.69509 | −18.0935 |
| 2.5 | 0 | 1.70 | −0.71218 | −175961 |
| 2.5 | 0 | 1.75 | −0.72893 | −17.1398 |
| 2.5 | 0 | 1.80 | −0.74536 | −16.719 |
| 2.5 | 0 | 1.85 | −0.76147 | −16.3292 |
| 2.5 | 0 | 1.90 | −0.7773 | −15.9666 |
| 2.5 | 0 | 1.95 | −0.79284 | −15.6281 |
| 2.5 | 0 | 2.00 | −0.80812 | −15.311 |
| 2.5 | 0.05 π | 1.60 | −0.6182 | −18.5329 |
| 2.5 | 0.05 π | 1.65 | −0.63587 | −17.9876 |
| 2.5 | 0.05 π | 1.70 | −0.65318 | −17.4904 |
| 2.5 | 0.05 π | 1.75 | −0.67014 | −17.0343 |
| 2.5 | 0.05 π | 1.80 | −0.68677 | −16.6137 |
| 2.5 | 0.05 π | 1.85 | −0.70308 | −16.2241 |
| 2.5 | 0.05 π | 1.90 | −0.71911 | −15.8617 |
| 2.5 | 0.05 π | 1.95 | −0.73484 | −15.5234 |
| 2.5 | 0.05 π | 2.00 | −0.75032 | −15.2066 |
| 2.5 | 0.1 π | 1.60 | −0.57325 | −18.2094 |

TABLE 1-continued

| electrode length ratio | bias deviation from π/2 | power ratio | chirp | on/off ratio |
|---|---|---|---|---|
| 2.5 | 0.1 π | 1.65 | −0.59161 | −17.6648 |
| 2.5 | 0.1 π | 1.70 | −0.60959 | −17.1682 |
| 2.5 | 0.1 π | 1.75 | −0.62719 | −16.7128 |
| 2.5 | 0.1 π | 1.80 | −0.64446 | −16.2929 |
| 2.5 | 0.1 π | 1.85 | −0.66141 | −15.904 |
| 2.5 | 0.1 π | 1.90 | −0.67805 | −15.423 |
| 2.5 | 0.1 π | 1.95 | −0.69439 | −15.2047 |
| 2.5 | 0.1 π | 2.00 | −0.71046 | −14.8886 |
| 2.0 | −0.05π | 1.60 | −0.63977 | −14.2231 |
| 2.0 | −0.05π | 1.65 | −0.65708 | −14.0227 |
| 2.0 | −0.05π | 1.70 | −0.67402 | −13.8258 |
| 2.0 | −0.05π | 1.75 | −0.69059 | −13.6331 |
| 2.0 | −0.05π | 1.80 | −0.79682 | −13.445 |
| 2.0 | −0.05π | 1.85 | −0.72274 | −13.2617 |
| 2.0 | −0.05π | 1.90 | −0.73835 | −13.0834 |
| 2.0 | −0.05π | 1.95 | −0.75367 | −12.9101 |
| 2.0 | −0.05π | 2.00 | −0.76872 | −12.7418 |
| 2.0 | 0 | 1.60 | −0.57975 | −18.639 |
| 2.0 | 0 | 1.65 | −0.59685 | −18.0935 |
| 2.0 | 0 | 1.70 | −0.61357 | −175961 |
| 2.0 | 0 | 1.75 | −0.62994 | −17.1398 |
| 2.0 | 0 | 1.80 | −0.64597 | −16.719 |
| 2.0 | 0 | 1.85 | −0.66169 | −16.3292 |
| 2.0 | 0 | 1.90 | −0.67711 | −15.9666 |
| 2.0 | 0 | 1.95 | −0.69224 | −15.6281 |
| 2.0 | 0 | 2.00 | −0.70711 | −15.311 |
| 2.0 | 0.05π | 1.60 | −0.53418 | −18.5329 |
| 2.0 | 0.05π | 1.65 | −0.55149 | −17.9876 |
| 2.0 | 0.05π | 1.70 | −0.56843 | −17.4904 |
| 2.0 | 0.05π | 1.75 | −0.585 | −17.0343 |
| 2.0 | 0.05π | 1.80 | −0.60123 | −16.6137 |
| 2.0 | 0.05π | 1.85 | −0.61715 | −16.2241 |
| 2.0 | 0.05π | 1.90 | −0.63276 | −15.8617 |
| 2.0 | 0.05π | 1.95 | −0.64808 | −15.5234 |
| 2.0 | 0.05π | 2.00 | −0.66313 | −15.2066 |
| 2.0 | 0.1 π | 1.60 | −0.50128 | −18.2094 |
| 2.0 | 0.1 π | 1.65 | −0.51926 | −17.6648 |
| 2.0 | 0.1 π | 1.70 | −0.53684 | −17.1682 |
| 2.0 | 0.1 π | 1.75 | −0.55405 | −16.7128 |
| 2.0 | 0.1 π | 1.80 | −0.57091 | −16.2929 |
| 2.0 | 0.1 π | 1.85 | −0.58744 | −15.904 |
| 2.0 | 0.1 π | 1.90 | −0.60365 | −15.423 |
| 2.0 | 0.1 π | 1.95 | −0.61956 | −15.2047 |
| 2.0 | 0.1 π | 2.00 | −063519 | −14.8886 |

From the above analysis and data, it is apparent that a variable chirp modulator may be constructed in accordance with the invention in which the electrode length ratio, the bias and the power ratio may be varied to influence both the chirp and the extinction or On/off ratio. In accordance with the principles of the invention, a variable chirp Mach Zehnder Interferometer type modulator is obtained by selecting an initial modulator design with uneven modulation between the two modulator waveguide arms by selecting a modulation ratio of 0.25, for example, to achieve a chirp parameter of α=−0.6, as a baseline.

The chirp parameter value can then be adjusted from the baseline by:

1. Changing the power ratio $\gamma=P_1/(P_1+P_2)$ between the two arms of the modulator. The power ratio may be changed with a tunable attenuator in one arm of the modulator; or 2. Moving the bias point away from quadrature by applying an offset DC bias; or 3. Combining both 2. and 3. to obtain a larger chirp range.

Advantageously, a chirp modulator in accordance with the invention can be realized with an X-cut or Z-cut substrate. In addition, a chirp value of −0.7 is achieved with an adjustable chirp range of up to ±0.25 or more with an extinction ratio of better than 15 dB. The impact of $V_\pi$ can be compensated with longer electrodes in the modulator.

In an implementation of a modulator in which an on/off ratio of −14 dB is desired, and the power between the two waveguide arms is not balanced, the power ratio x=4/9, and 9/4. Setting the value for negative chirp at −0.9, a length ratio of $$\frac{L_{e2}}{L_{e1}} = \frac{l_2}{l_1} = 2.61$$

is obtained. If it is desired to obtain the same phase shift for both a configuration of equal length electrodes and unbalanced length electrodes, the following calculations can be made. For equal length electrodes $\phi_0=2KL_0$ and for the unbalanced electrode case $\phi=2Kl_1+K(l_2-l_1)=3.61Kl_1$. Equating the two cases yields $l_1=0.554L_0$ and $l_2=1.446L_0$. In this embodiment, the electrode length of the longer electrode is approximately 45% longer than the equal length electrodes, whereas, for balanced power, the electrode length of the longer electrode is about 55% greater that the equal length electrodes.

Utilizing the foregoing analysis, other embodiments of the invention have been developed.

Figure 10:
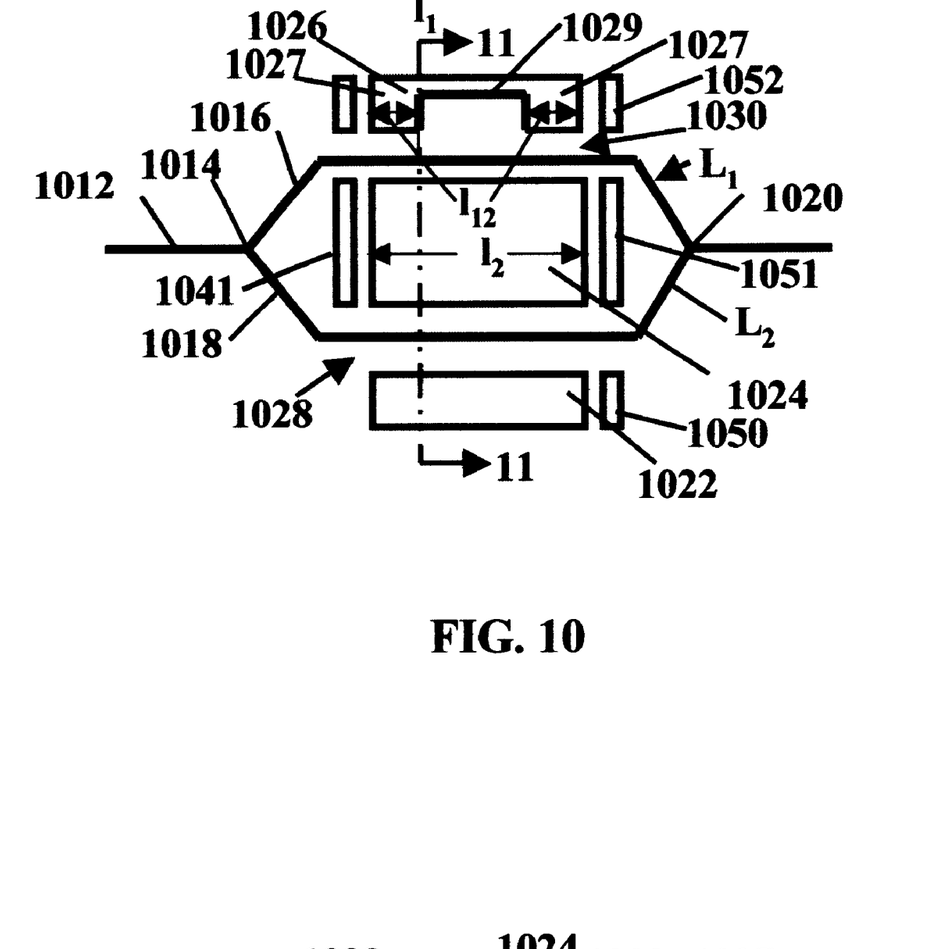
FIG. 10 illustrates a third integrated optic modulator in accordance with the principles of the invention.
Figure 11:
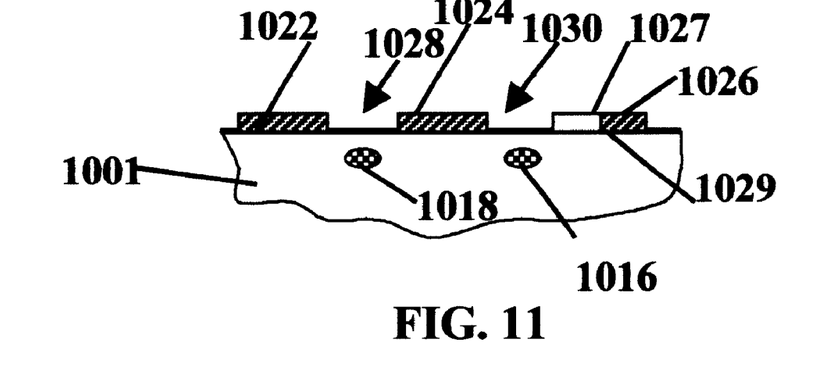
FIG. 11 is a partial cross-section of the modulator of FIG. 10 taken along lines 11—11.

Turning now to FIG. 10, a modulator 1010 in accordance with the principles of the invention is shown. Integrated optic modulator 1010 includes an optical waveguide 1012 that is split by an optical splitter 1014 into two waveguide arms 1016, 1018. Optical waveguide arms 1016, 1018 are rejoined with an optical coupler 1020. FIG. 11 shows modulator 1010 in cross section taken along lines 11—11. The modulator 1010 is formed on a substrate 1001 that is lithium niobate. As will be appreciated by those skilled in the art, substrate 1001 may be of other material including, but not limited to GaAs. Optical waveguide arms 1016, 1018 are formed in substrate 1001. Electrodes 1022, 1024, 1026 are formed on substrate 1001 proximate optical waveguide arms 1016, 1018. The distance between electrode 1022 and electrode 1024 is the same as the distance between electrode 1024 and portions 1027 of electrode 1026, providing even gaps 1028, 1030 between electrode pairs. Electrodes 1022 and 1024 are of substantially equal effective length, $l_2$, proximate waveguide arm 1016. Electrode 1026 is configured so as to provide a different effective electrode length, $l_1$, proximate waveguide arm 1018. The particular configuration shown in FIGS. 10 and 11 is such that electrode 1026 includes a plurality of portions 1027, numbering two in the specific embodiment shown, that have a combined length of $l_1$ proximate waveguide arm 1018. The remaining portion or portions 1029 of electrode 1026 are spaced apart from waveguide arm 1018 so as to have minimal modulation effect. A variable attenuator 1040 is formed in waveguide arm 1018 and includes electrodes 1041, 1042. The variable attenuator 1040 is utilized to provide unequal power splitting in the two waveguide arms 1016, 1018. Bias electrodes 1050, 1051, 1052 are also provided.

Figure 12:
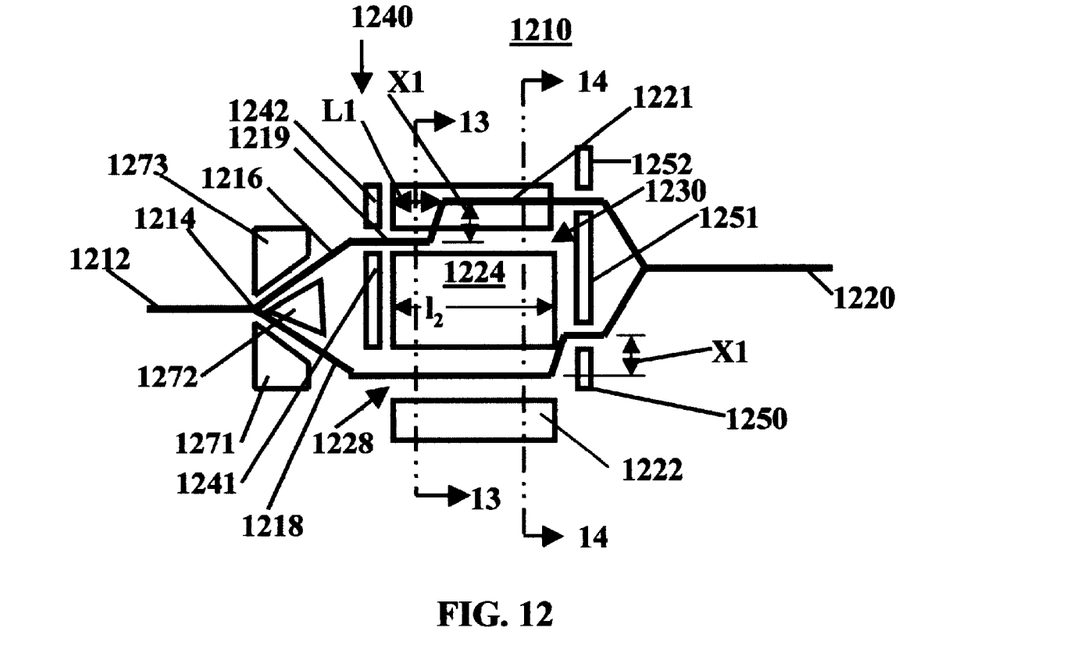
FIG. 12 illustrates a fourth integrated optic modulator in accordance with the invention.
Figure 13:
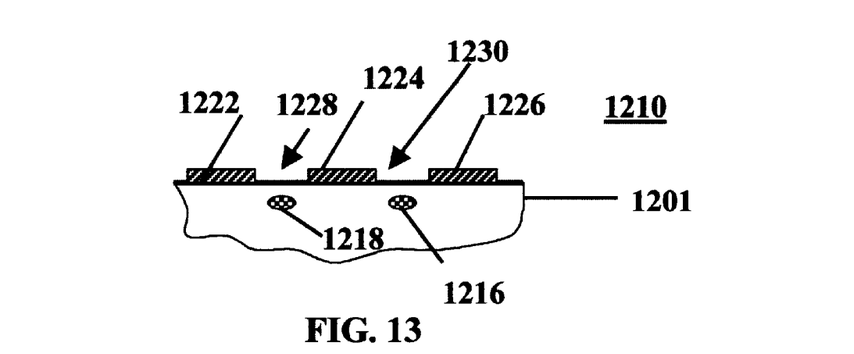
FIG. 13 is a partial cross-section of the modulator of FIG. 12 taken along lines 13—13.
Figure 14:
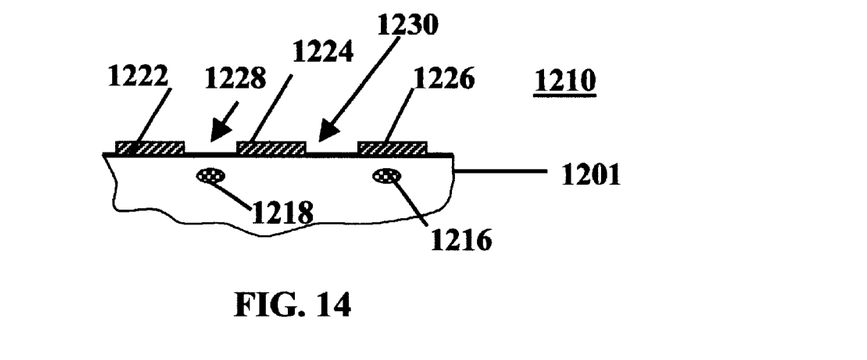
FIG. 14 is a partial cross-section of the modulator of FIG. 12 taken along lines 14—14.

Turning now to FIG. 12, a modulator 1210 in accordance with the principles of the invention is shown. Integrated optic modulator 1210 includes an optical waveguide 1212 that is split by an optical splitter or tunable coupler 1214 into two waveguide arms 1216, 1218. Optical waveguide arms 1216, 1218 are rejoined with an optical coupler 1220. FIG. 13 shows modulator 1210 in cross section taken along lines 13—13 and FIG. 14 shows modulator 1210 in cross section taken along lines 14—14. Modulator 1210 is formed on a substrate 1201 that is lithium niobate. As will be appreciated by those skilled in the art, substrate 1201 may be of other material including, but not limited to GaAs. Optical waveguide arms 1216, 1218 are formed in substrate 1201.

Electrodes 1222, 1224, 1226 are formed on substrate 1201 proximate optical waveguide arms 1216, 1218. The distance or gap 1228 between electrode the electrode pair comprising electrode 1222 and electrode 1224 is the same as the distance or gap 1230 between the electrode pair comprising electrode 1224 and electrode 1226. Electrodes 1222 and 1224 are of substantially equal effective length, $l_2$, proximate waveguide arm 1216. Electrode 1226 and optical waveguide arm 1218 are cooperatively configured so as to provide a different effective electrode length, $l_1$, proximate waveguide arm 1218. The particular configuration shown in FIGS. 12, 13 and 14 is such that waveguide arm 1218 includes a first portion 1219 that is disposed between electrodes 1224, 1226 and a second portion 1221 that is offset from portion 1219 and disposed out of the area of substrate 1201 that is affected by a modulation voltage impressed across electrodes 1226, 1128. The amount of offset ×1 between portion 1219 and portion 1221 provided by offset portion 1223 is matched in waveguide arm 1216 by portion 1215. The offset portion 1215 is provided in waveguide arm 1216 to provide for equal optical path lengths in the two waveguide arms 1216 and 1218. A variable attenuator 1240 is formed in waveguide arm 1218 and includes electrodes 1241, 1242. Variable attenuator 1240 is utilized to provide unequal power splitting in the two waveguide arms 1216, 1218. Bias electrodes 1250, 1252, 1254 are also provided and utilized to provide bias. Also shown if FIG. 12 is a variable coupler 1270 comprising electrodes 1271, 1272, 1273. Typically either variable coupler 1270 or variable attenuator 1240 is used to control the power split between waveguide arms 1216, 1218.

The invention has been described in terms of several embodiments. It will be apparent to those skilled in the art that various changes and modifications may be made to the embodiments shown and described without departing from the spirit or scope of the invention. It is intended that the invention includes all such changes and modifications and other changes and modifications that are not specifically mentioned. It is further intended that the invention not be limited in scope to the embodiments shown and described, but that the invention is limited in scope only by the claims appended hereto.

What is claimed is:

1. An optical modulator, comprising:

an optical waveguide, said optical waveguide splitting for part of its length into first and second waveguides arms, said waveguide arms recombining to an output waveguide portion;

a first electrode pair proximate said first waveguide arm, the electrodes of said first electrode pair arranged with respect to each other and said first waveguide arm to subject a first portion of said first waveguide to a first modulating electric field;

a second electrode pair proximate said second waveguide arm, the electrodes of said second electrode pair arranged with respect to each other and to said second waveguide arm to subject a first portion of said second waveguide arm to a second modulating electric field, said second waveguide first portion being selected to be shorter than said first waveguide first portion, said first waveguide first portion and said second waveguide first portion being selected to provide a predetermined amount of chirp; and apparatus in said optical waveguide providing for different optical power levels in said first and said second waveguide arms to control the amount of chirp.

2. An optical modulator, comprising:

an optical waveguide, said optical waveguide splitting for part of its length into first and second waveguide arms, said waveguide arms recombining to an output waveguide portion;

a first electrode pair proximate said first waveguide arm, the electrodes of said first electrode pair arranged with respect to each other and said first waveguide arm to subject a first portion of said first waveguide to a first modulating electric field;

a second electrode pair proximate said second waveguide arm, the electrodes of said second electrode pair arranged with respect to each other and to said second waveguide arm to subject a first portion of said second waveguide arm to a second modulating electric field, said second waveguide first portion being selected to be shorter than said first waveguide first portion, said first waveguide first portion and said second waveguide first portion being selected to provide a predetermined amount of chirp; and said second waveguide arm comprising a second portion offset from said second gap so as to be outside of said second electric field.

3. An optical modulator in accordance with claim 2, wherein:

said second waveguide arm second portion is disposed substantially under one of said electrodes of said second electrode pair.

4. An optical modulator in accordance with claim 3, wherein:

said first waveguide arm first portion being equal in optical length to the total length of said second waveguide arm first portion and said second waveguide arm second portion.

5. An optical modulator in accordance with claim 4, comprising:

said second waveguide arm comprises an offset portion connecting said second waveguide arm first and second portions.

6. An optical modulator in accordance with claim 5, comprising:

said first waveguide arm comprising an offset portion disposed so that the total length of said first waveguide arm first portion and said first waveguide offset portion equals the total length of said second waveguide arm first, second and offset portions.

7. An optical modulator in accordance with claim 6, comprising:

means for providing unequal optical power in said first and said second waveguide arms.

8. An optical modulator in accordance with claim 7, comprising:

said means providing less power in said second waveguide arm than provided in said first waveguide arm.

9. An optical modulator in accordance with claim 8, comprising:

a first pair of bias electrodes disposed proximate said first waveguide arm; and a second pair of bias electrodes disposed proximate said second waveguide arm.

10. An optical modulator in accordance with claim 6, comprising:

a tunable attenuator disposed in said second waveguide arm to vary the amount of chirp produced by said modulator.

11. An optical modulator in accordance with claim 6, comprising:
- a tunable "Y" coupling said optical waveguide to said first and second waveguide arms, said tunable "Y" being adjustable to control the power split between said first and said second waveguide arms.

12. An optical modulator in accordance with claim 11, comprising:
- a first pair of bias electrodes disposed proximate said first waveguide arm; and
- a second pair of bias electrodes disposed proximate said second waveguide arm.

13. An optical modulator in accordance with claim 12, wherein:
- said first and said second pairs of bias electrodes share a common electrode.

14. An optical modulator, comprising:
- an optical waveguide, said optical waveguide splitting for part of its length into first and second waveguide arms, said waveguide arms recombining to an output waveguide portion;
- a first electrode pair proximate said first waveguide arm, the electrodes of said first electrode pair arranged with respect to each other and said first waveguide arm to subject a first portion of said first waveguide to a first modulating electric field;
- a second electrode pair proximate said second waveguide arm, the electrodes of said second electrode pair arranged with respect to each other and to said second waveguide arm to subject a first portion of said second waveguide arm to a second modulating electric field, said second waveguide first portion being selected to be shorter than said first waveguide first portion, said first waveguide first portion and said second waveguide first portion being selected to provide a predetermined amount of chirp; and wherein
- said first pair of electrodes are spaced apart by a first gap;
- said second pair of electrodes are spaced apart by a second gap; and
- said first gap and said second gap are substantially equal in width.

15. An optical modulator in accordance with claim 14, comprising:
- said first waveguide arm first portion is disposed under said first gap; and
- said second waveguide arm first portion is disposed under said second gap.

16. An optical modulator, comprising:
- an optical waveguide, said optical waveguide splitting for part of its length into first and second waveguide arms, said waveguide arms recombining to an output waveguide portion;
- a first electrode pair proximate said first waveguide arm, the electrodes of said first electrode pair arranged with respect to each other and said first waveguide arm to subject a first portion of said first waveguide to a first modulating electric field;
- a second electrode pair proximate said second waveguide arm, the electrodes of said second electrode pair arranged with respect to each other and to said second waveguide arm to subject a first portion of said second waveguide arm to a second modulating electric field, said second waveguide first portion being selected to be shorter than said first waveguide first portion, said first waveguide first portion and said second waveguide first portion being selected to provide a predetermined amount of chirp; and
- an optical waveguide coupler for coupling said first and said second waveguide arms together to combine the outputs of said first and said second waveguide arms.

17. An optical modulator, comprising:
- an optical waveguide;
- first and second optical waveguide arms;
- an optical apparatus coupled to said waveguide and coupled to said first and second waveguide arms;
- a common electrode; disposed between said first and second waveguide arms;
- a first electrode disposed on one side of said common electrode and spaced apart therefrom to produce a first gap;
- a second electrode disposed on another side of said common electrode and spaced apart therefrom to produce a second gap;
- said first waveguide arm comprising a first portion positioned proximate said first gap;
- said second waveguide arm comprising a first portion positioned proximate said second gap and a second portion positioned a distance away from said second gap; and
- said first waveguide arm first portion having a first length, said second waveguide arm first portion having a second length, said first length and said second length having a predetermined relationship, said predetermined relationship determines a nominal value of chirp for said modulator.

18. An optical modulator in accordance with claim 17, wherein:
- said first waveguide arm first portion length has a second predetermined relationship to the total length of said second waveguide first portion and said second waveguide second portion.

19. An optical modulator in accordance with claim 17, wherein:
- said first waveguide arm first portion is positioned in a plane under said first gap; and
- said second waveguide arm first portion in positioned in a plane under said second gap.

20. An optical modulator in accordance with claim 17, wherein:
- said first waveguide arm has a first total optical length;
- said second waveguide arm has a second total optical length; and
- said first total optical length is substantially equal to said second total optical length.

21. An optical modulator in accordance with claim 20, comprising:
- means for controlling the amount of optical power from said optical waveguide that is provided to said first waveguide arm first portion and to said second waveguide arm first portion to vary said chirp from said nominal value of chirp.

22. An optical modulator in accordance with claim 21, wherein:
- said power controlling means comprises a tunable attenuator disposed in one of said first or said second waveguide arms.

23. An optical modulator in accordance with claim 22, wherein:

said tunable attenuator is disposed in said second waveguide arm.

24. An optical modulator in accordance with claim 21, wherein:

said power controlling means comprises a tunable "y" operable to control the amount of power provided to said first waveguide arm and to said second waveguide arm.

* * * * *